(12) United States Patent
Huang et al.

(10) Patent No.: US 7,481,555 B2
(45) Date of Patent: Jan. 27, 2009

(54) LED MELODY DECORATION KIT WITH MULTICOLOR LIGHT SOURCES

(75) Inventors: Fang-Yue Huang, Hsinchu (TW); Wen-Chen Chung, Hsinchu (TW)

(73) Assignee: Excellence Opto, Inc., Hsinchu (TW)

( * ) Notice: Subject to any disclaimer, the term of this patent is extended or adjusted under 35 U.S.C. 154(b) by 0 days.

(21) Appl. No.: 11/645,061

(22) Filed: Dec. 26, 2006

(65) Prior Publication Data

US 2008/0151538 A1  Jun. 26, 2008

(51) Int. Cl.
*F21S 4/00* (2006.01)
(52) U.S. Cl. .................. 362/252; 362/800; 362/251
(58) Field of Classification Search ................. 362/800, 362/252
See application file for complete search history.

(56) References Cited

U.S. PATENT DOCUMENTS 6,367,952 B1 * 4/2002 Gibboney, Jr. .............. 362/249
7,175,302 B2 * 2/2007 Kazar et al. ................. 362/231

* cited by examiner

*Primary Examiner*—Anabel M Ton
(74) *Attorney, Agent, or Firm*—Bacon & Thomas, PLLC

(57) ABSTRACT

A LED melody decoration kit with multicolor light sources comprises an electrical wire with a plug-connector to get a voltage from a traditional lighting string, one or more LED lights to emit single or multiple lighting colors, and a cover package having a driving IC to drive and control the LED lights, which is directly applicable to change one of the incandescent lamps from a traditional lighting string for replacement, and which do not change the function of the original lighting string to emit single color or different multiple colors and obviously create plenty of effect in lighting string.

8 Claims, 6 Drawing Sheets

LED MELODY DECORATION KIT WITH MULTICOLOR LIGHT SOURCES

BACKGROUND OF THE INVENTION

1. Field of the Invention

The present invention relates to a LED melody decoration kit with multicolor light sources, more particularly the LED melody decoration kit is applicable to be incorporated with a traditional lighting string to create plenty of effect in lighting string.

2. Description of the Prior Art

During the Christmas day or festival every year, people will use the decorative light with color or the shaped light string on the Christmas tree or on the windows for celebration. But the consumers fail to change the shape of bulb.

Take a traditional lighting string 10 shown in FIG. 1 as an example, which comprises an electrical wire 11 and a plurality of incandescent lamps 20 arranged electrically in series circuit with the electrical wire 11. Each incandescent lamp 20 of the lighting string 10 is constituted with a lamp socket 21, a lamp holder 22 and a mini-bulb 23. Each lamp socket 21 coupled to the electrical wire 11 is to provide power to the corresponding mini-bulb 23 which is electrically connected to the lamp socket 21 through the corresponding lamp holder 22 fastened on the lamp socket 21.

However, the defect of the incandescent lamps 20 used on a traditional lighting string 10 shown in FIG. 1 is the mini-bulb 23 with a flaw in very high temperature and with a frigid outfit of glasses. Thus, some of them may use Light Emitting Diode (hereinafter referred to as "LED") to replace the mini-bulb 23 of the incandescent lamps 20 used on a traditional lighting string 10.

But the LED is unable to directly replace the mini-bulb 23 of the incandescent lamps 20 in theory, which is difficult in the assembling application due to the limitation of LED's characteristic. To improve this potential defect, it needs to design a special electric circuit program for improvement.

Based on this, the present invention may create a lot of advantages, such as saving cost, increasing plenty colors and the luminous intensity, as well as the attractiveness, etc. Consequently, it may achieve the purpose that one of the incandescent lamp in a traditional lighting string is to be superseded by the LED lamp with the claimed device of a LED melody decoration kit with multicolor light sources.

SUMMARY OF THE INVENTION

The primary objective of this invention is to provide a LED melody decoration kit to upgrade the novelty, interest, attractiveness with multicolor in lighting string which comprises an electrical wire integrating with a plug-connector on the terminal to get a voltage from a traditional lighting string, one or more LED lights to emit single or multiple lighting colors, and a control unit having a driving IC to drive and control the LED lights, a voltage-multiplied and rectified circuit to double the voltage got from the plug-connector and a constant voltage regulated circuit to stabilize the pulse/surge voltage input to the driving IC.

The LED melody decoration kit of the present invention is able to directly change one of the incandescent lamps from a traditional lighting string for replacement and to emit single color or different multiple colors, it will not change the function in the original lighting string and will create plenty of effect in lighting string.

The LED melody decoration kit of the present invention may emit the changeable lights with different colors and may apply to various lighting string or tree light to improve the incandescent lamp with drab shape and monotonous function.

The LED melody decoration kit of the present invention may integrate with different shape or lighting string to create the different changes in shape. It may also integrate a music control box with horn to voice various music or festival and theme songs.

DESCRIPTION OF THE PREFERRED EMBODIMENT

Figure 1:
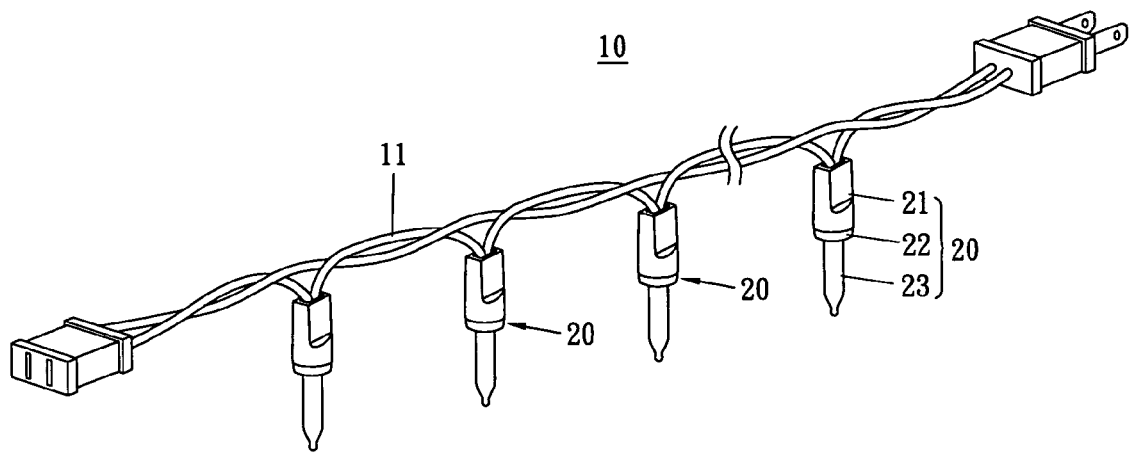
FIG. 1 is a schematic view showing a traditional lighting string with a plurality of incandescent lamps.
Figure 2:
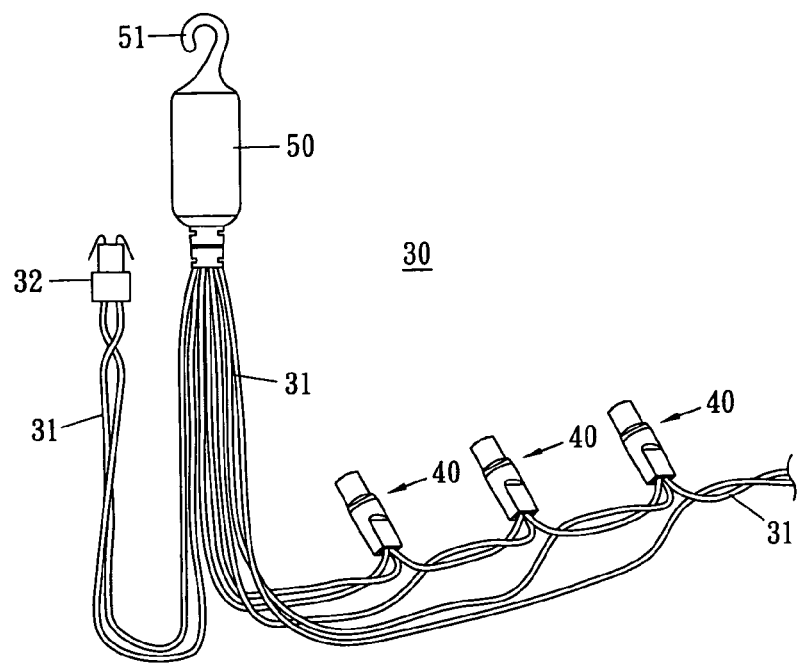
FIG. 2 is a schematic view for the LED melody decoration kit with multicolor light sources of the present invention.
Figure 4:
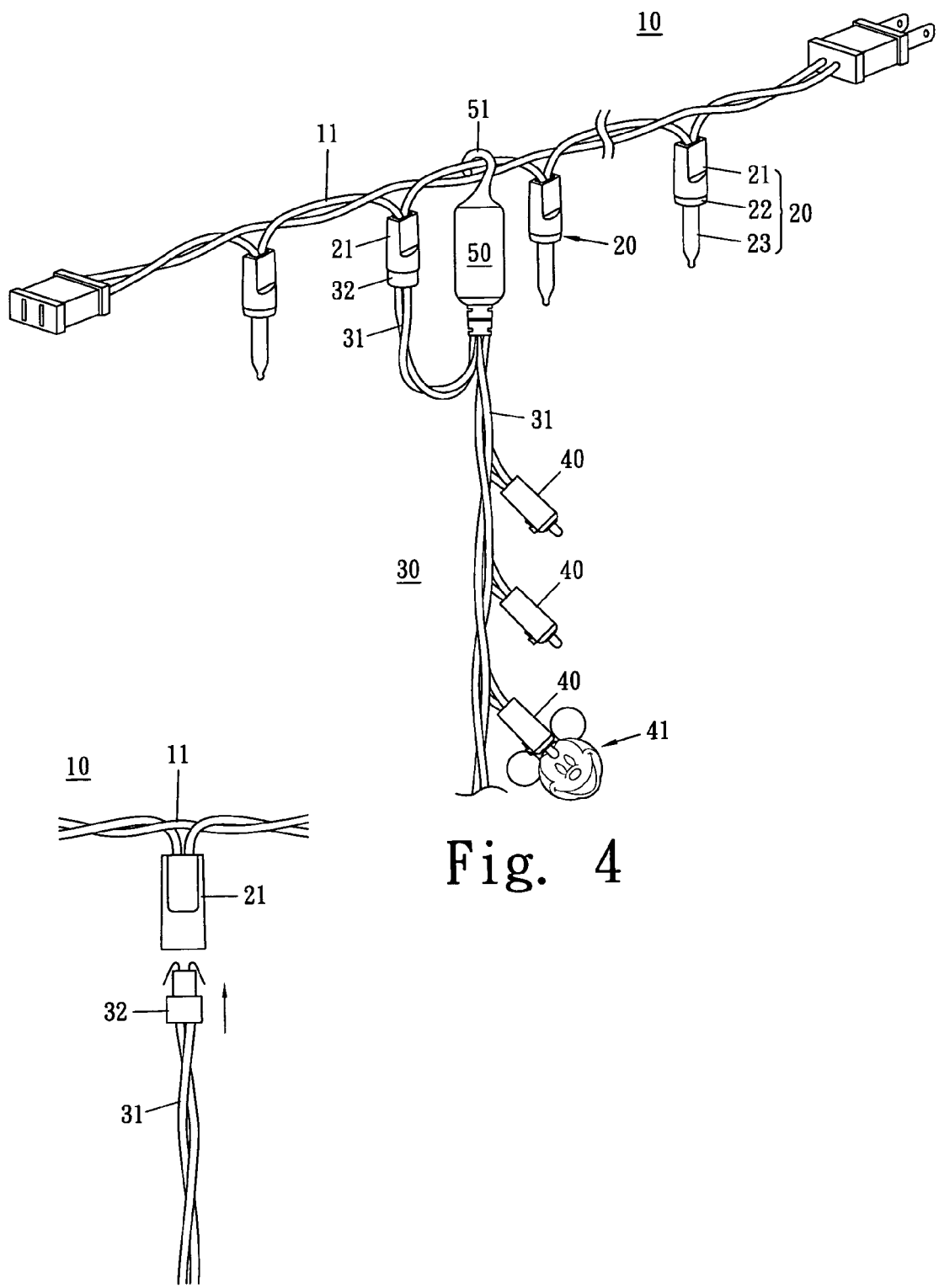
FIG. 4 is a schematic view to show the LED melody decoration kit of the present invention practically in application to the traditional lighting string of FIG. 1 and further to show those LED lights of the present invention may be covered with an outfit for decoration.

As shown in FIGS. 2 and 4, the LED melody decoration kit 30 of the present invention provided with multicolor light sources is designed to be incorporated with a traditional lighting string 10 to create plenty of effect in lighting string.

Generally, the traditional lighting string 10 comprises an electrical wire 11 and a plurality of incandescent lamps 20 arranged electrically in series circuit with the electrical wire 11. Each incandescent lamp 20 applied to the traditional lighting string 10 is constituted with a lamp socket 21, a lamp holder 22 and a mini-bulb 23, and each lamp socket 21 coupled to the electrical wire 11 is to provide power to the corresponding mini-bulb 23 which is electrically connected to the lamp socket 21 through the corresponding lamp holder 22 fastened on the lamp socket 21.

Figure 7:
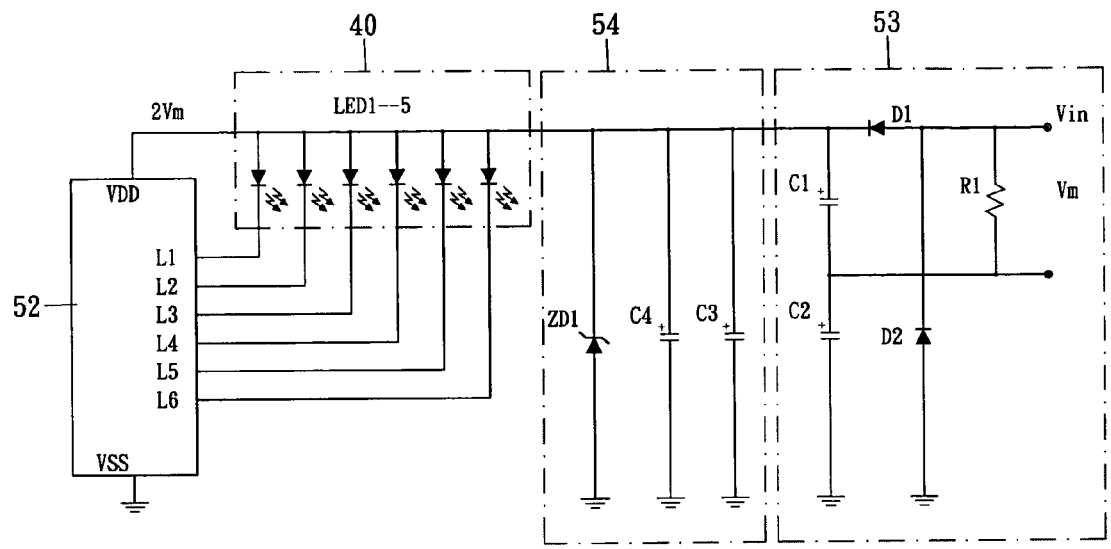
FIG. 7 shows an electric circuit program applied to the LED melody decoration kit of the present invention which comprises a voltage-multiplied and rectified circuit, a constant voltage regulated circuit and a driving IC to drive one or more LED lights to emit different colors.

As shown in FIGS. 2 and 7, the LED melody decoration kit 30 of the present invention comprises an electrical wire 31 integrating with a plug-connector 32 on the terminal, one or more LED lights 40 to emit different lighting colors and a control unit 50 having a driving IC 52, a voltage-multiplied and rectified circuit 53 and a constant voltage regulated circuit 54 inside to control and emit the LED lights 40 simultaneously.

Figure 5:
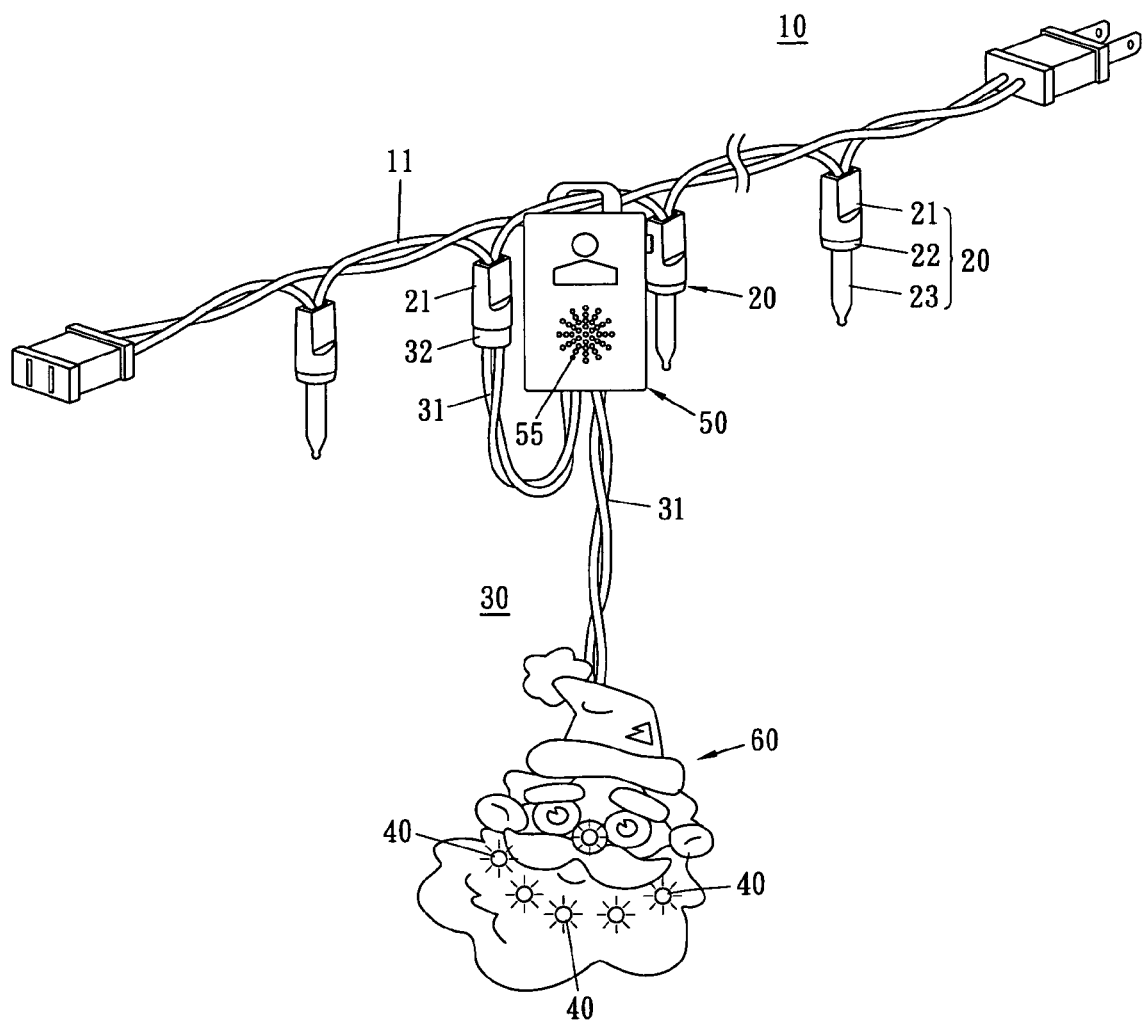
FIG. 5 is a schematic view to show several LED lights of the present invention are integrated with a flat ornament or card and further to show the LED melody decoration kit of the present invention may be provided with a music device and incorporated with a traditional lighting string to create plenty of effect in lighting string.
Figure 8:
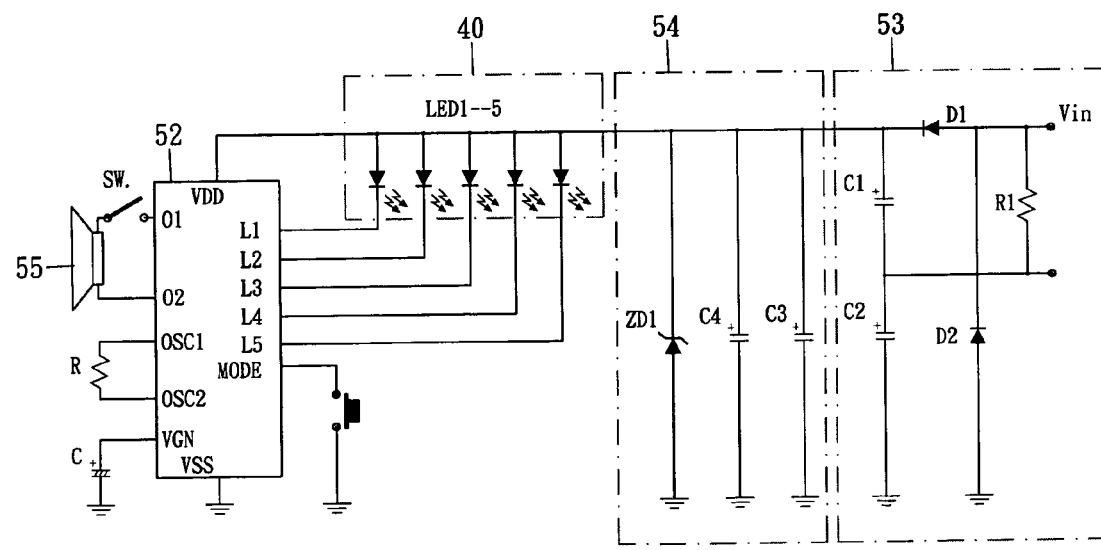
FIG. 8 shows the electric circuit program of FIG. 7 may use the driving IC further to drive a music device to voice the music or various effect of sound.

As shown in FIGS. 5 and 8, another embodiment of the present invention is that the cover package 50 further has a music device with horn 55 to voice the music or various effect of sound.

Figure 3:
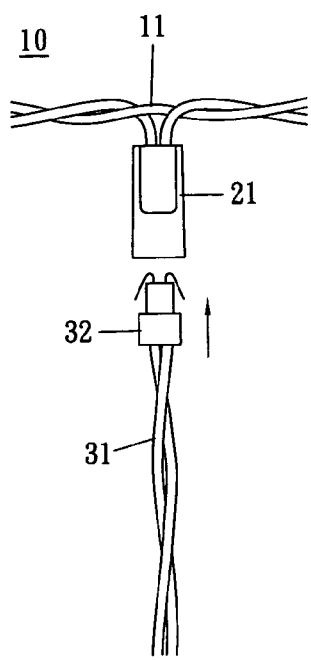
FIG. 3 is an illustrated diagram to explain the LED melody decoration kit of the present invention how to get the required power from the traditional lighting string of FIG. 1.

Referred to FIGS. 3 and 4, the power required for the LED melody decoration kit 30 of the present invention to control and emit the LED lights 40 is supplied from the traditional lighting string 10.

It is designed by changing one of the incandescent lamps 20 from the traditional lighting string 10 and replacing the selected incandescent lamps 20 by the LED melody decoration kit 30 of the present invention. In particular, it is designed by removing the lamp holder 22 and the mini-bulb 23 from any one of lamp sockets 21 of the traditional lighting string 10, and then plugging the plug-connector 32 of the electric wire 31 of the LED melody decoration kit 30 of the present invention into the lamp socket 21 and in connection to the positive contact and the negative contact in serial circuit of the electrical wire 11 of the traditional lighting string 10 to get the voltage from power source. Therefore, it will not change the function in the original lighting string 10.

Figure 6:
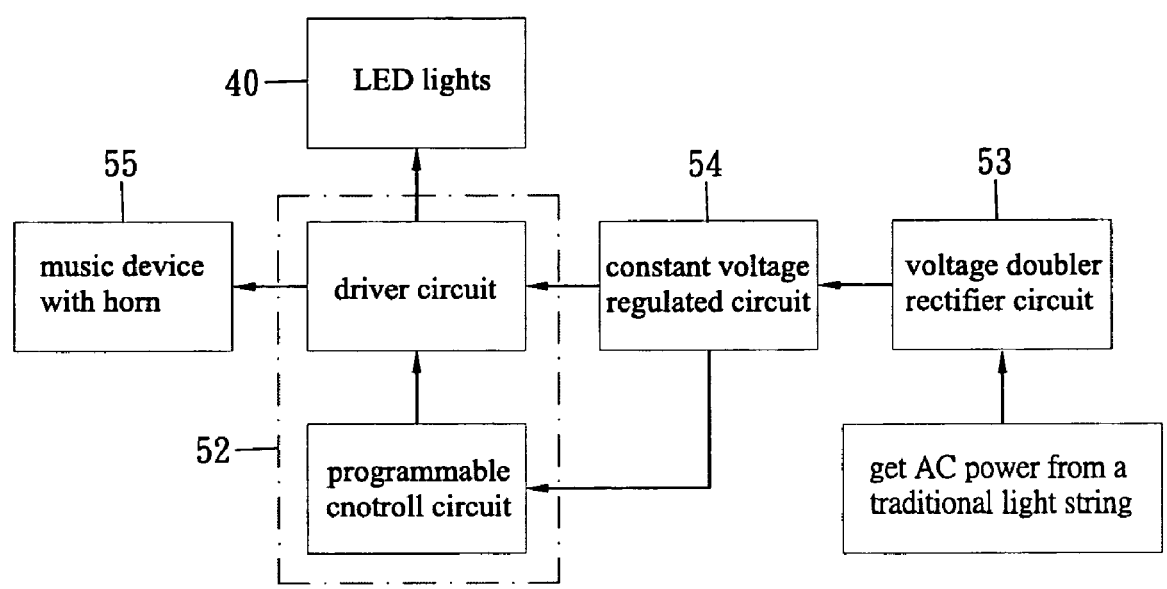
FIG. 6 shows a control block diagram of the LED melody decoration kit of the present invention.

Referring to FIGS. 6 and 7, when the plug-connector 32 of the present invention get a voltage of Vm from power source of the traditional lighting string 10, the resistor R1 of voltage-multiplied and rectified circuit 53 (or called voltage double rectifier circuit 53) of the present invention will get the voltage Vm directly, and the voltage is then multiplied up to 2 Vm after the voltage Vm had processed through diodes D1 and D2 and capacitors C1 and C2 of voltage-multiplied and rectified circuit 53 of the present invention. And, the voltage 2 Vm is further processed through capacitors C3 and C4 and zener diode ZD1 of the constant voltage regulated circuit 54 of the present invention to stabilize the pulse/surge voltage which may input to the IC 52 to drive and control the changes of LED lights 40 of present the invention or further to drive and control a music device with horn 55 to voice the music or various effect of sound from the control unit 50 of the invention.

The driving IC 52 of the present invention comprises a driver circuit and a programmable control circuit which are designed in application to drive and control the LED lights 40 to emit different colors which are full of variety in single or multiple lighting colors.

As shown in FIGS. 2 and 4, the control unit 50 of the LED melody decoration kit 30 of the present invention may be further provided with a hook 51 so that the LED melody decoration kit 30 of the present invention may be incorporated with the traditional lighting string 10 through the hook 51 of the control unit 50 to create plenty of effect in lighting string.

As shown in FIG. 4, the LED lights 40 of the present invention may be covered with an outfit 41 for decoration which may be changed with various shapes to make the LED melody decoration kit 30 of the present invention to be more attractive and lovely.

Figure 9:
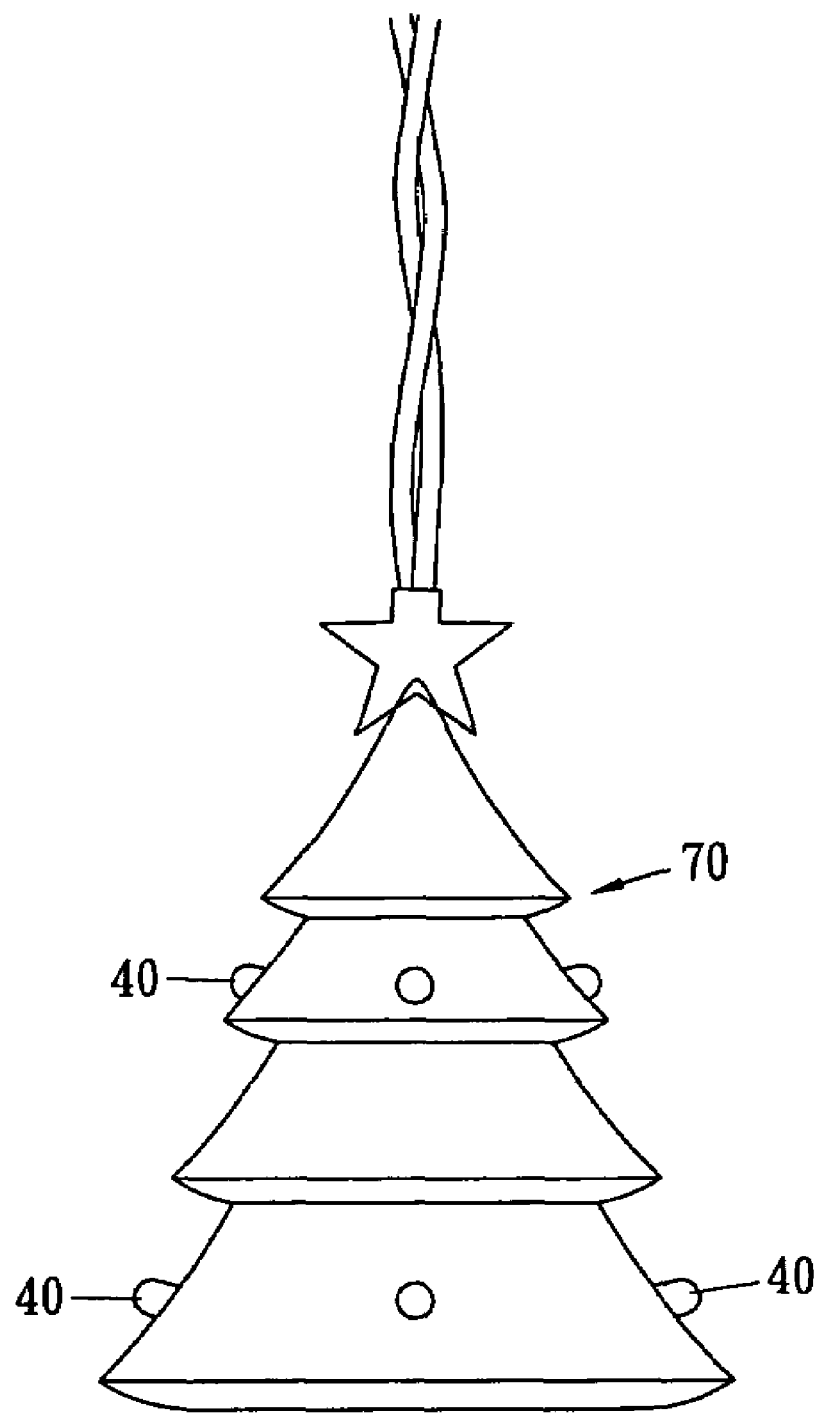
FIG. 9 is a schematic view to show several LED lights of the present invention are integrated with a three-dimensional pattern.

In addition, several LED lights 40 applied to the LED melody decoration kit 30 of the present invention may be further integrated with a flat ornament or card 60 as shown in FIG. 5 or a three-dimensional pattern 70 as shown in FIG. 9 to upgrade the novelty, interest, attractiveness with multicolor in lighting string.

The contents disclosed above relate to a preferred embodiment of the present invention. It is to be understood that all equivalent modifications, variations, improvement or changes that are easily made by skillful people in the trade and without departing from the spirit of the above contents and drawings should be included in the subject claim.

What is claimed is:

1. A LED melody decoration kit with multicolor light sources, comprising:
    an electrical wire integrated with a plug-connector arranged to fit into one of a plurality of incandescent light sockets of a traditional lighting string including said plurality of incandescent light sockets, to get a voltage Vm from the traditional lighting string;
    a control unit connected between the electrical wire and the one or more LED lights, said control unit having a driving IC that includes a driver circuit and a programmable control circuit for driving and controlling the LED lights, a voltage-multiplied and rectified circuit connected to the electrical wire to receive and double the voltage Vm from the plug-connector and obtain a pulse/surge voltage 2 Vm, and a constant voltage regulated circuit connected between the voltage-multiplied and rectified circuit and the driving IC to stabilize the pulse/surge voltage 2 Vm and input the pulse/surge voltage 2 Vm to the driving IC; and
    one or more LED lights connected to be driven and controlled by the driver circuit and the programmable control circuit of the driving IC to emit single or multiple lighting colors.

2. The LED melody decoration kit with multicolor light sources as defined in claim 1, wherein the control unit further has a music device with horn which is driven and controlled by the driving IC.

3. The LED melody decoration kit with multicolor light sources as defined in claim 1, wherein the control unit has a hook for hanging the control unit from the traditional lighting string.

4. The LED melody decoration kit with multicolor light sources as defined in claim 2, wherein the control unit has a hook for hanging the control unit from the traditional lighting string.

5. The LED melody decoration kit with multicolor light sources as defined in claim 1, wherein the lighting color emitted from the one or more LED lights includes red, yellow, green, amber, blue, white or mixed with various changes in colors.

6. The LED melody decoration kit with multicolor light sources as defined in claim 1, wherein at least one of the at least one or more LED lights is covered with an outfit for decoration.

7. The LED melody decoration kit with multicolor light sources as defined in claim 1, wherein several of the LED lights are integrated with a flat ornament or card.

8. The LED melody decoration kit with multicolor light sources as defined in claim 1, wherein several of the LED lights are integrated with a three-dimensional pattern.

* * * * *